United States Patent

[15] 3,705,688

Smale

[45] Dec. 12, 1972

[54] OVAL JET NOZZLE
[72] Inventor: Charles H. Smale, Indianapolis, Ind.
[73] Assignee: General Motors Corporation, Detroit, Mich.
[22] Filed: Sept. 7, 1971
[21] Appl. No.: 178,041

[52] U.S. Cl. .......................................... 239/265.39
[51] Int. Cl. ............................................. B64c 15/06
[58] Field of Search ....... 239/265.11, 265.19, 265.33, 239/265.37, 265.39

[56] References Cited

UNITED STATES PATENTS

| 2,487,588 | 11/1949 | Price | 239/265.33 X |
| 2,590,272 | 3/1952 | Robertson | 239/265.33 |
| 2,693,078 | 11/1954 | Laucher | 239/265.39 |
| 2,927,424 | 3/1960 | Hyde | 239/265.39 |
| 3,471,090 | 10/1969 | Papst | 239/265.11 X |
| 3,575,260 | 4/1971 | Urguahart | 239/265.33 X |

Primary Examiner—Lloyd L. King
Assistant Examiner—Reinhold W. Thieme
Attorney—Paul Fitzpatrick et al.

[57] ABSTRACT

A variable jet propulsion nozzle of the multiflap type is characterized by an oval cross-section of the nozzle. The nozzle is reinforced against the effect of pressure tending to deform it toward a more nearly circular cross-section by a hollow reinforcing ring pressurized from within the exhaust duct. The nozzle has an ovate polygonal actuating ring for moving the flaps of the nozzle reciprocated by power cylinders coupled to the actuating ring by pull rods. The reinforcing ring includes tubes defining a sealed-off way through the reinforcing ring for the pull rods.

4 Claims, 6 Drawing Figures

INVENTOR.
Charles H. Smale
BY
Paul Fitzpatrick
ATTORNEY

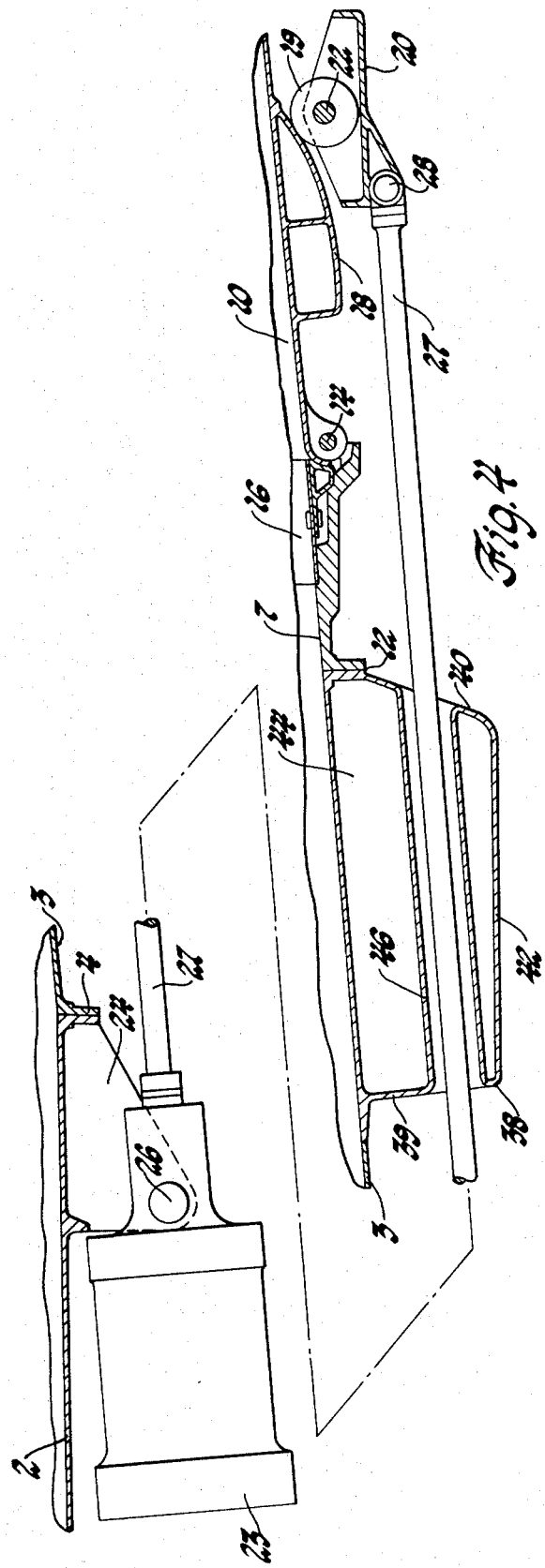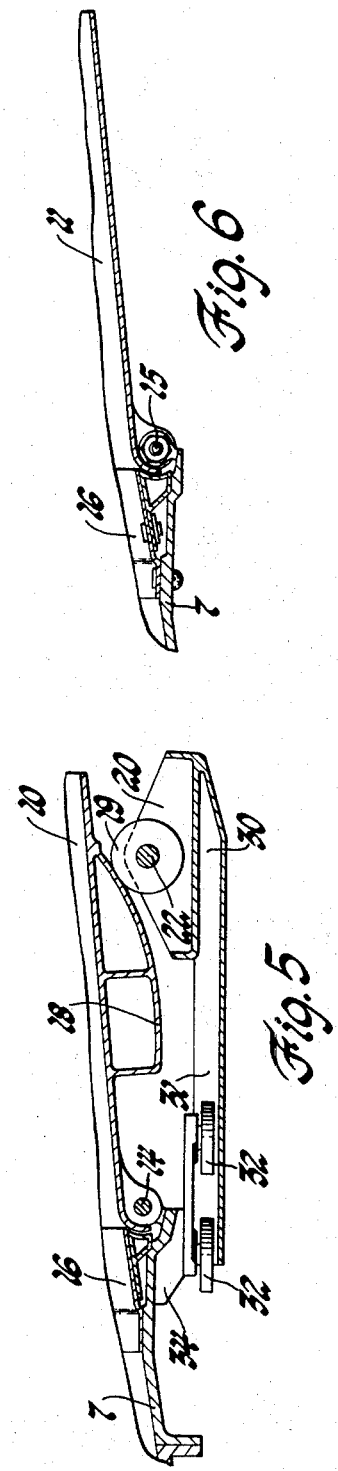

OVAL JET NOZZLE

My invention is directed to variable-area exhaust nozzles for jet propulsion engines, and is particularly concerned with the provision of a nozzle of generally oval cross-section to adapt the nozzle to certain installation requirements of an aircraft. More specifically, my invention is intended to provide a nozzle having maximum area and minimum space requirements for installation within the confines of an oval nacelle, and with structural arrangements to make the nozzle structure feasible and practicable and to counter the natural tendency of a noncircular duct to be distorted toward a circular form by contained pressure.

Jet propulsion engines for aircraft are well known and widely used, and in many cases such engines have been provided with means for varying the area of the jet propulsion nozzle of the engine to suit operating conditions. Such variable-area nozzles are particularly required when the engine includes an afterburner.

There are many technical structural or operating problems in connection with such nozzles because of the facts that they are generally large structures, must be very light, and most control flow of gases at very high temperatures and under substantial pressure.

One type of variable-area nozzle which has been widely used is the multiflap type in which the exhaust nozzle area is varied by inward and outward movement of a ring of flaps hinged at the outlet end of the engine exhaust duct. Examples of such nozzles are described in U.S. Pat. Nos. to Gaubatz, 2,697,907, Dec. 28, 1954, and to Gardiner, 2,828,602, Apr. 1, 1958.

The structures described in these patents are nozzles of circular cross-section. My invention has been conceived in response to a requirement for a nozzle of oval cross-section to fit into a particular aircraft installation. By the term "oval" I mean a cross-section which is approximately elliptical or, in other words, roughly approximates a circle but is of greater dimension along one transverse axis than along a second axis at right angles thereto.

As will be apparent, when a structure of this sort contains gas at substantial pressure above the environment, there is a tendency for the pressure to restore the structure to a circular cross-section creating very substantial distortion. Such distortion would impair or destroy the ability of the ring of nozzle flaps to operate as necessary to control the area of the jet outlet.

My invention is directed to arrangements to overcome this problem including a reinforcing ring near the outlet of the oval duct which is pressurized from within the duct to increase its resistance to deformation and in adaptations of the nozzle flap actuating mechanism to the oval structure.

The principal object of my invention is to provide a satisfactory variable-area jet propulsion nozzle of oval cross-section, and more particularly to provide a nozzle of a multiflap type having such a cross-section. A further object is to minimize the space requirements for a jet propulsion nozzle of a particular area while attaining an oval cross-section of the nozzle.

The nature of my invention and its advantages will be clear to those skilled in the art from the succeeding detailed description of the preferred embodiment of the invention and the accompanying drawings thereof.

FIG. 4 is an enlarged partial longitudinal sectional view, taken on the plane indicated by the line 4—4 in FIG. 2, particularly illustrating the actuating mechanism.

FIG. 5 is a partial longitudinal sectional view taken on the plane indicated by the line 5—5 in FIG. 2.

FIG. 6 is a fragmentary longitudinal sectional view taken on the plane indicated by the line 6—6 in FIG. 2.

Figure 1:
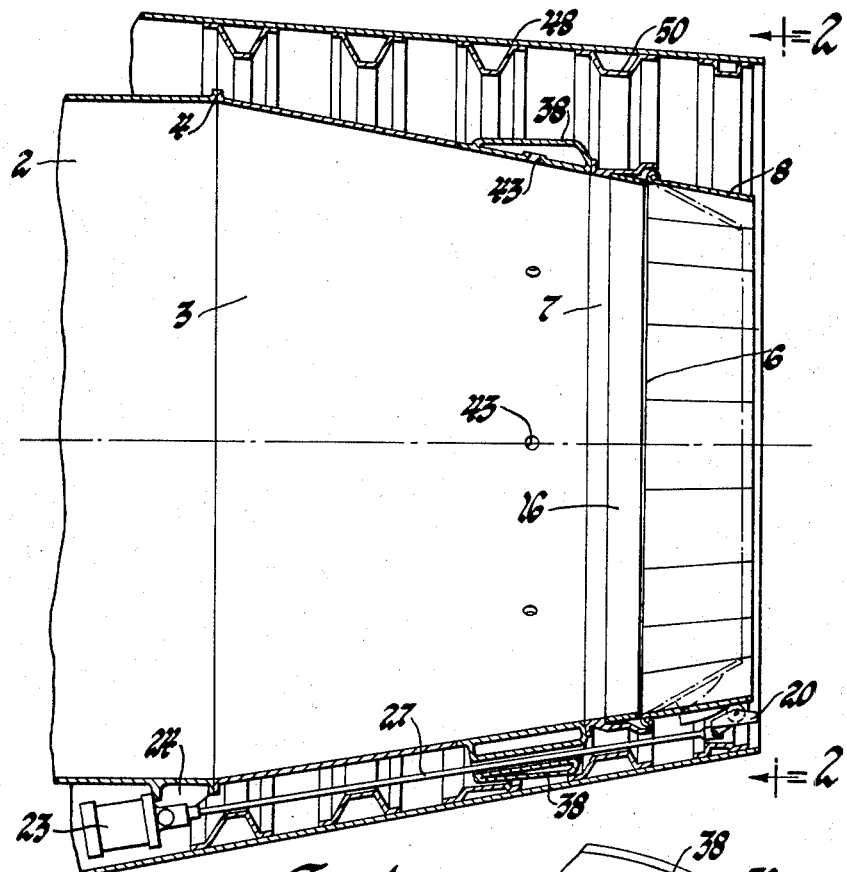
FIG. 1 is a longitudinal sectional view of a jet propulsion nozzle installation.

Referring first to FIG. 1, there is shown the terminal portion of a tailpipe 2 which is supplied with hot gas from a turbojet engine (not shown) and which may include an afterburner (not shown). The tailpipe 2 delivers the hot pressurized gas to an exhaust duct 3 fixed to it at bolting flanges 4 at the inlet end of the exhaust duct. The tailpipe 2 and inlet end of the exhaust duct are of circular cross-section. The exhaust duct converges to an outlet end at 6 which is of oval, that is, approximately elliptical, cross-section and is smaller in every dimension than the inlet end. The vertical diameter of the exhaust duct shown is considerably less than the horizontal diameter, as will be apparent from FIGS. 2 and 3.

The outlet end of the nozzle is defined by a mounting ring 7 on which a ring 8 of flaps are mounted. Each flap is mounted for rotation about an axis tangent to the ring 7. As shown, the ring 8 of flaps is made up of ten master flaps 10 and ten slave flaps 11. The slave flaps underlie the master flaps and bridge the gaps between them, relative sliding of the edges of the flaps accommodating the inward movement of the flaps from the wide open position illustrated in FIG. 2 to the minimum area position illustrated in FIG. 3.

Referring to FIGS. 4 and 6 for more detailed description, it will be seen that the mounting ring 7 is fixed to the exhaust duct 3 at bolting flanges 12. The master flaps 10 are hinged to the rings 7 by pins 14, and the slave flaps 11 by pins 15. A seal ring 16 fixed to the mounting ring serves to minimize leakage between the mounting ring and flaps. Details of the flaps and seals are not material to my invention and may follow any satisfactory practice in the art; therefore they are not described in detail.

Figure 2:
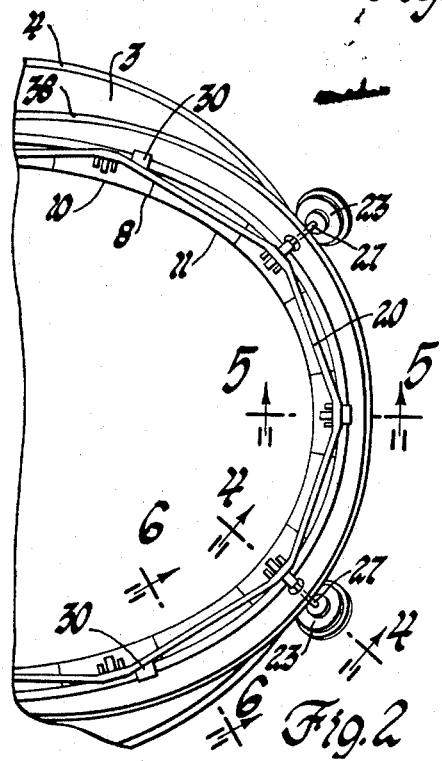
FIG. 2 is a rear end elevation view of the same, taken on the plane indicated by the line 2—2 in FIG. 1, illustrating the nozzle in open condition.
Figure 3:
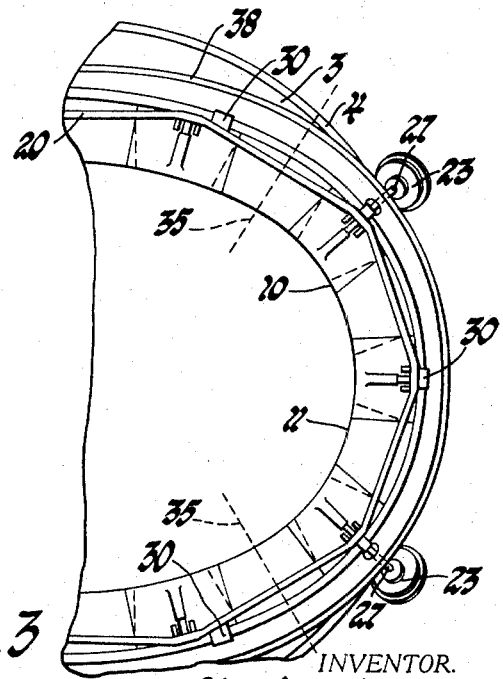
FIG. 3 is a view similar to FIG. 2 illustrating the nozzle in minimum area condition.

Each master flap has rigidly mounted on its exterior a cam 18 which cooperates with a roller 19 mounted on an actuating ring 20 and rotatable about a shaft 22. The actuating ring 20 is a rigid structure of oval or ovate shape to correspond to the nozzle and preferably, as shown clearly in FIGS. 2 and 3, is of ovate polygonal form with the corners of the polygon at the locations of the rollers 19. Since the pressure tends to open the nozzle, it is only necessary for the rollers 19 to be advanced to the position shown in FIG. 4 to move the master flaps inwardly, and these carry the slave flaps inwardly with them.

The actuating ring 20 is moved by actuators 23, preferably four in number, and which in this particular case are hydraulic power cylinders. Cylinders 23 are fixed to the tailpipe 2 by brackets 24 which may be welded to the tailpipe 2 and which cooperate with bosses 26 extending from the cylinders.

When energized, the cylinders draw pull rods 27 forwardly, these being connected by cross pins 28 to the ring 20 so that the ring is moved forward while remaining perpendicular to the axis of the duct. Any suitable type of actuator and any suitable means for synchronizing the actuators may be employed.

The actuating ring 20 is guided and centered at six points by guides 30 (FIG. 5) including flanges 31 which move between pairs of rollers 32 on brackets 34 on the mounting ring 7.

The actual cross-section of the nozzle in the preferred embodiment, which is one form of oval, is an approximation to an ellipse defined by four circular arcs terminating at the broken lines 35 shown in FIG. 3 and corresponding points at the opposite side of the vertical center plane of the nozzle. Note that the circular arcs terminate at the center of slave flaps. Also, specifically, in this case, the size of the opening of the mounting ring 7 is such that its major axis is approximately 37 inches and its minor axis approximately 30 inches. This configuration makes it possible to fit the variable nozzle into a space in the aircraft which was originally intended for a fixed nozzle and makes the most of the available space by providing the oval variable jet nozzle.

The means to counteract the tendency for pressure to enlarge the minor axis of the nozzle is a reinforcing ring 38 (FIG. 4) which is a sheet metal structure welded to the outer surface of the exhaust duct 3 and which may be considered to include a part of the rear bolting flange 12 of the duct 3.

The reinforcing ring 38, more specifically, is defined by a forward wall 39, a rear wall 40, and a peripheral wall 42.

The wall 42 is of oval cross-section, specifically in the embodiment described an oval defined by two semi-circular arcs and two straight line segments between the circular arcs, the straight line segments being approximately 7 inches in length in this case. This structure is welded up so as to be air tight except for a ring of small holes 43 which connect the interior of the duct 3 with the chamber 44 within the reinforcing ring. The reinforcing ring structure is light in weight and of low profile, as will be apparent from FIG. 1. Four tubes 46 sealed to the front and rear walls of the reinforcing ring provide a way for passage of the pull rods 27.

As previously stated, the oval nozzle cross-section is defined by four circular arcs meeting at lines 35 (FIG. 3). These arcs have a common tangent at the meeting points but, of course, different radii. This requires compensation of some sort for best sealing at the junction between the slave flaps which are located at lines 35 and the master flaps at each side of them.

With cams 18 of identical contour, which is preferred, this compensation may be achieved by hinging those slave flaps at the junction of the arcs on axes angled to some extent to the tangent to the arcs. Such an axis may be selected for any particular case in response to the specific dimensions of the nozzle and the range of flap movement or particular values of nozzle opening through which optimum sealing is to be secured.

Thus, in this case, these four slave flaps are exceptions to the general statement that the flap hinge axes are tangent to the ring 7. Of course, other means such as diverse cams 18 or flexible slave flaps at 35 may be employed if desired.

FIG. 1 shows a typical installation of the exhaust duct and variable nozzle in a nacelle 48 which might be an engine nacelle or the tail end of an aircraft fuselage. As shown, the nacelle 48 is a tapering structure somewhat oval in cross-section reinforced by hat-section rings 50. The cross-section of the nacelle is an approximation to the same sort of oval as the jet nozzle, which is dimensioned to make best use of available space.

It should be apparent to those skilled in the art from the foregoing description that my invention provides a structure particularly adapted to the requirements of practice in a variable jet nozzle which is configured to suit a housing or nacelle having a generally elliptical cross-section.

The detailed description of the preferred embodiment of the invention for the purpose of explaining the principles thereof is not to be considered as limiting or restricting the invention, as many modifications may be made by the exercise of skill in the art.

I claim:

1. A variable-area jet propulsion nozzle comprising, in combination, an engine exhaust duct adapted to conduct pressurized gas, the duct having an outlet end of oval cross-section; a ring of overlapping flaps hinged to the outlet end of the duct and concurrently movable to vary the area for discharge of gas from the duct; means for moving the flaps concurrently coupled to the flaps; and a hollow reinforcing ring fixed on the outer surface of the duct near the outlet end and communicating with the duct to pressurize the reinforcing ring.

2. A variable-area jet propulsion nozzle comprising, in combination, an engine exhaust duct adapted to conduct pressurized gas, the duct having an inlet end of circular cross-section and an outlet end of oval cross-section; a ring of overlapping flaps hinged to the outlet end of the duct and concurrently movable to vary the area for discharge of gas from the duct; an actuating ring of ovate polygonal form for moving the flaps concurrently mounted for reciprocation axially of the duct and coupled to the flaps; and a hollow reinforcing ring fixed on the outer surface of the duct near the outlet end and communicating with the duct to pressurize the reinforcing ring.

3. A variable-area jet propulsion nozzle comprising, in combination, an engine exhaust duct adapted to conduct pressurized gas, the duct having an outlet end of oval cross-section; a ring of overlapping flaps hinged to the outlet end of the duct and concurrently movable to vary the area for discharge of gas from the duct; an actuating ring for moving the flaps concurrently mounted for reciprocation axially of the duct and coupled to the flaps; a hollow reinforcing ring fixed on the outer surface of the duct near the outlet end and communicating with the duct to pressurize the reinforcing ring; a plural number of actuators for reciprocating the actuating ring; rods extending axially of the duct coupling the actuators to the actuating ring; and tubes sealed in the reinforcing ring providing a way through the reinforcing ring for the rods.

4. A variable-area jet propulsion nozzle comprising, in combination, an engine exhaust duct adapted to conduct pressurized gas, the duct having an outlet end of oval cross-section defined by successive arcs of different radii meeting at points spaced around the circumference of the duct; a ring of overlapping flaps hinged to the outlet end of the duct and concurrently movable to vary the area for discharge of gas from the duct, the flaps including alternating master and slave flaps, the said meeting points being bridged by slave flaps, the hinge axes of the bridging slave flaps being angled to the common tangent to the said arcs at the meeting point; means for moving the flaps concurrently coupled to the master flaps; and a hollow reinforcing ring fixed on the outer surface of the duct near the outlet end and communicating with the duct to pressurize the reinforcing ring.

* * * * *